(12) United States Patent
Yaras et al.

(10) Patent No.: US 12,163,486 B2
(45) Date of Patent: Dec. 10, 2024

(54) EXHAUST MIXER WITH PROTRUSIONS

(71) Applicant: PRATT & WHITNEY CANADA CORP., Longueuil (CA)

(72) Inventors: Metin Ilbay Yaras, Ottawa (CA); Mark Cunningham, Montreal-West (CA); Raja Ramamurthy, Montréal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/152,326

(22) Filed: Jan. 10, 2023

(65) Prior Publication Data

US 2024/0229740 A1 Jul. 11, 2024

(51) Int. Cl.
*F02K 1/48* (2006.01)
*F02K 1/38* (2006.01)

(52) U.S. Cl.
CPC ............. *F02K 1/48* (2013.01); *F02K 1/386* (2013.01)

(58) Field of Classification Search
CPC ... F02K 1/386; F02K 1/48; F02K 1/46; F05D 2250/61; F05D 2250/611
See application file for complete search history.

(56) References Cited

U.S. PATENT DOCUMENTS

| | | | |
|---|---|---|---|
| 4,165,609 A * | 8/1979 | Rudolph | F02K 1/386 239/265.17 |
| 4,487,017 A | 12/1984 | Rodgers | |
| 4,576,002 A | 3/1986 | Mavrocostas | |
| 5,291,672 A | 3/1994 | Brown | |
| 6,502,383 B1 * | 1/2003 | Janardan | F02K 1/46 60/264 |

(Continued)

FOREIGN PATENT DOCUMENTS

FR 3036138 A1 11/2016
WO 03/025377 A1 3/2003

OTHER PUBLICATIONS

Michael J. Walsh, "Riblets as a Viscous Drag Reduction Technique", Apr. 1983, AIAA Journal, vol. 21, No. 4, pp. 485-486 (Year: 1983).*

(Continued)

*Primary Examiner* — Ehud Gartenberg
*Assistant Examiner* — Henry Ng
(74) *Attorney, Agent, or Firm* — NORTON ROSE FULBRIGHT CANADA LLP

(57) ABSTRACT

An exhaust mixer assembly for a gas turbine engine includes a core passage extending along a central engine axis for directing a core gas flow. An outer annular passage coaxially surrounds the core passage for directing a bypass gas flow. An exhaust mixer communicating with the core passage and outer annular passages has an upstream end, a downstream end and an annular wall extending therebetween. The annular wall defines a mixing plane at a trailing edge thereof at the downstream end at which the core and bypass gas flows are mixed. The annular wall has a radially inner surface and a radially outer surface. A plurality of protrusions are disposed on and extend laterally along and radially from at the radially inner surface and/or the radially outer surface. The plurality of protrusions are arranged one alongside another on the radially inner surface and/or the radially outer surface.

17 Claims, 7 Drawing Sheets

(56) References Cited

U.S. PATENT DOCUMENTS

| | | |
|---|---|---|
| 7,389,635 B2 | 6/2008 | Anderson et al. |
| 9,631,542 B2* | 4/2017 | Subramaniyan ........ F01N 13/08 |
| 2009/0320486 A1 | 12/2009 | Gutmark et al. |
| 2010/0170261 A1* | 7/2010 | Stieger .................. B64D 33/06 60/771 |
| 2014/0260283 A1* | 9/2014 | Bouchard ................. F02K 1/48 60/770 |
| 2014/0319242 A1 | 10/2014 | Meyer |

OTHER PUBLICATIONS

European Search Report issued in EP counterpart application No. 24150971.0 on Jun. 7, 2024.

* cited by examiner

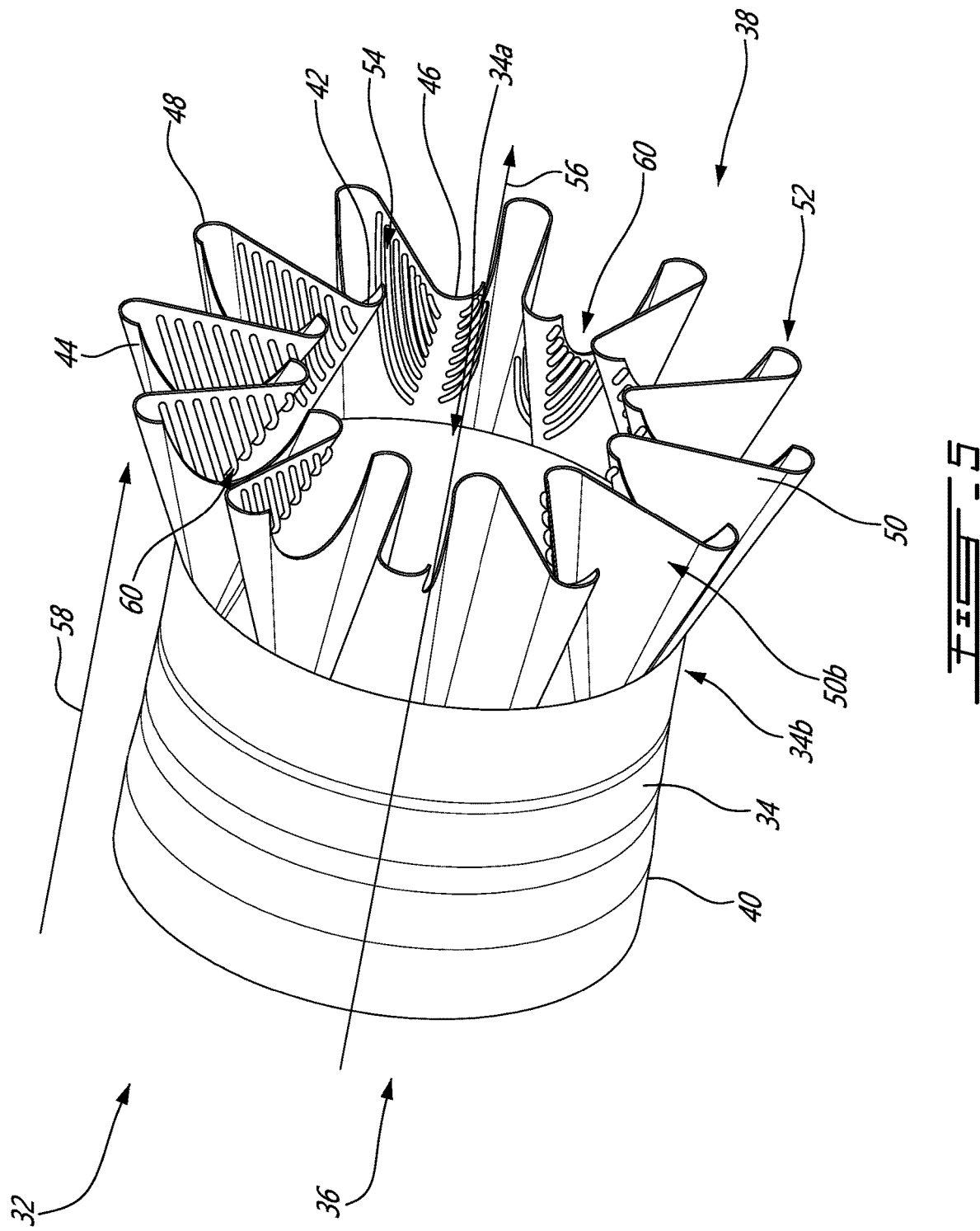

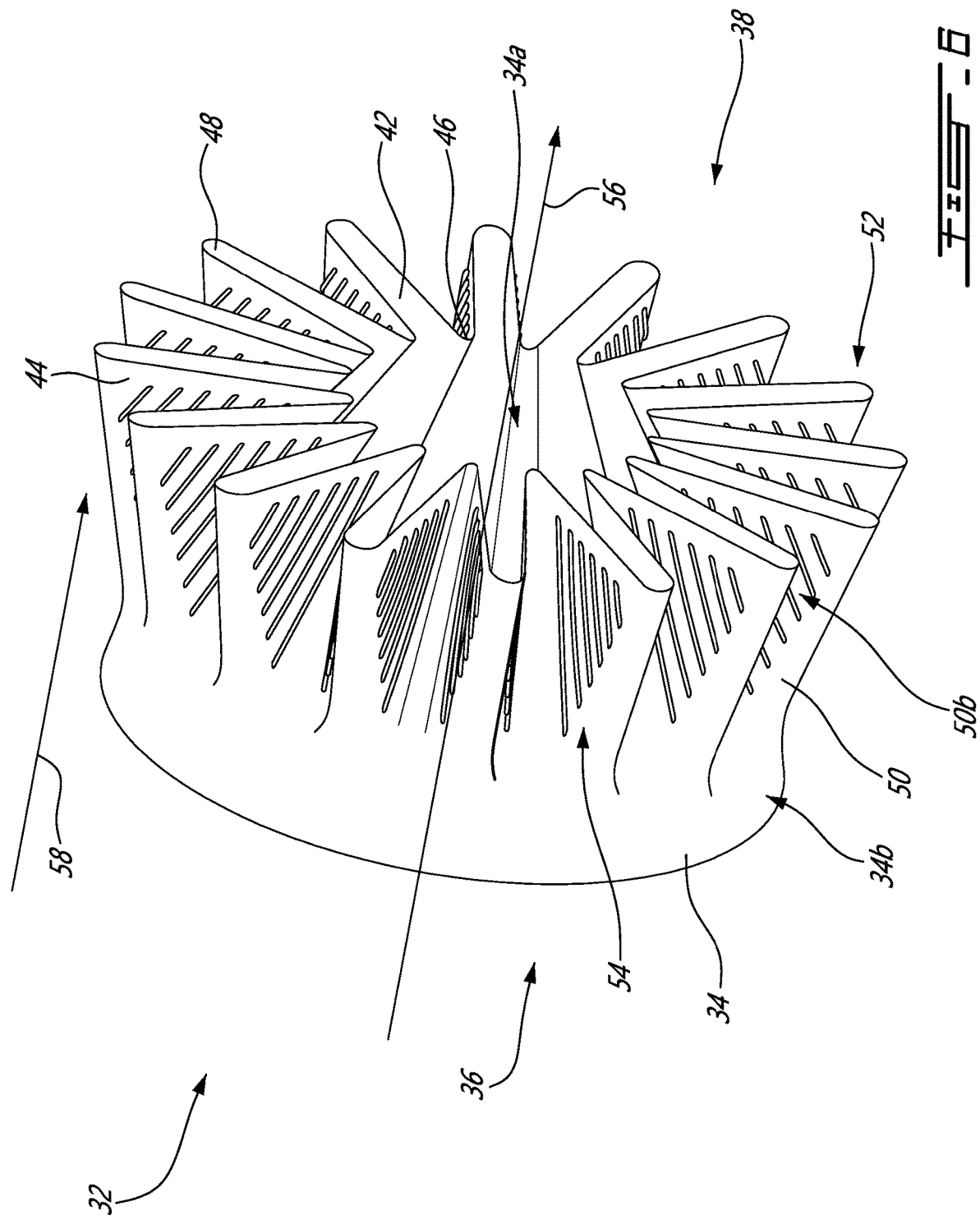

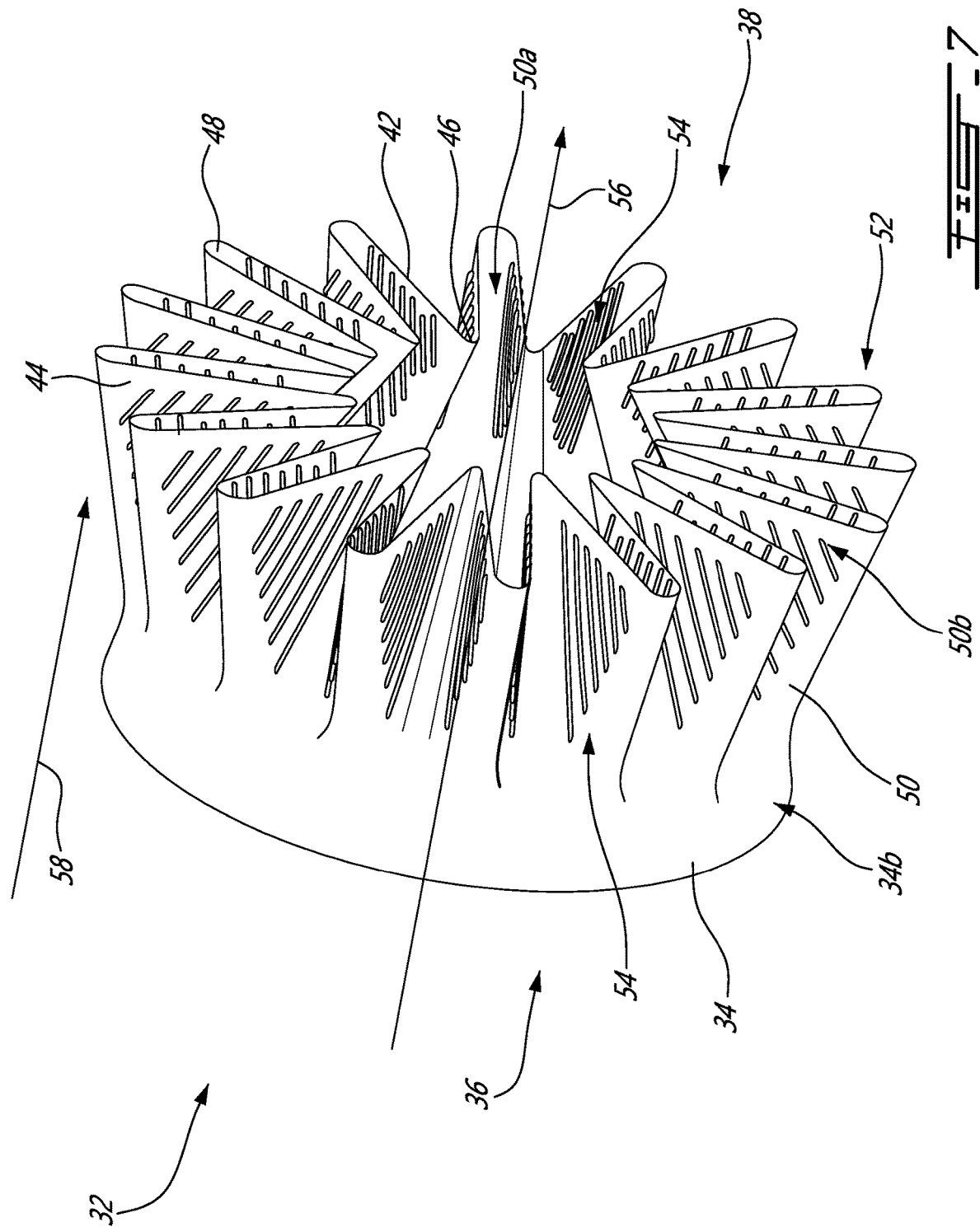

EXHAUST MIXER WITH PROTRUSIONS

TECHNICAL FIELD

The disclosure relates generally to aircraft engines and, more particularly, to exhaust mixers for aircraft engines.

BACKGROUND

In turbofan engines, high velocity gases from the turbofan core are mixed with low velocity air from the bypass duct, and the air-gas mixture is then exhausted from the engine. Turbofan engines generally use exhaust mixers in order to increase the mixing of the high and low velocity fluid flows and provide additional thrust. Various different configurations of exhaust mixers have been used in order to increase the mixing of the fluid flows. For instance, it is known to use lobed-shaped exhaust mixers in order to provide an increase in the mixing of the core and bypass fluid flows by creating vortices downstream of the mixer. Increased mixing of the high and low velocity flows increases the performance of turbofan engines.

However, there remains a need for improvement mixing solutions.

SUMMARY

In one aspect, there is provided an exhaust mixer assembly for a gas turbine engine, the exhaust mixer assembly comprising a core passage extending along a central axis of the gas turbine engine for directing a core gas flow, an outer annular passage coaxially surrounding the core passage for directing a bypass gas flow, and an exhaust mixer communicating with the core passage and the outer annular passage, the exhaust mixer having an upstream end, a downstream end and an annular wall extending therebetween, the annular wall defining a mixing plane at a trailing edge thereof at the downstream end at which the core gas flow and the bypass gas flow are mixed, the annular wall having a radially inner surface and a radially outer surface, a plurality of protrusions disposed on and extending laterally along and radially from at least one of the radially inner surface and the radially outer surface, the plurality of protrusions arranged one alongside another on the at least one of the radially inner surface and the radially outer surface.

In another aspect, there is provided a turbofan exhaust mixer comprising an annular wall extending around a central axis, the annular wall extending axially from an upstream end to a trailing edge at downstream end, the annular wall having a radially inner surface and a radially outer surface, a plurality of protrusions disposed on and extending laterally along and radially from at least one of the radially inner surface and the radially outer surface, the plurality of protrusions arranged one alongside another on the at least one of the radially inner surface and the radially outer surface.

In a further aspect, there is provided a method for operating a turbofan engine, comprising directing a core gas flow through a main gas path of the turbofan engine, directing a bypass gas flow through an annular bypass passage of the turbofan engine, mixing the core gas flow and the bypass gas flow at an exhaust mixer in fluid communication with the main gas path and the annular bypass passage, the exhaust mixer having an upstream end, a downstream end and an annular wall extending therebetween, the annular wall defining a mixing plane at a trailing edge thereof at the downstream end at which the core gas flow and the bypass gas flow are mixed, the annular wall having a radially inner surface and a radially outer surface, a plurality of protrusions disposed on and extending laterally along and radially from at least one of the radially inner surface and the radially outer surface, the plurality of protrusions arranged one alongside another on the at least one of the radially inner surface and the radially outer surface, and exhausting a mixture of the core gas flow and the bypass gas flow from the turbofan engine.

BRIEF DESCRIPTION OF THE DRAWINGS

Reference is now made to the accompanying figures in which:

FIG. 5 is a perspective view of the exhaust mixer of the engine of FIG. 1, according to another embodiment of the present disclosure;

FIG. 6 is a perspective view of the exhaust mixer of the engine of FIG. 1, according to another embodiment of the present disclosure; and FIG. 7 is a perspective view of the exhaust mixer of the engine of FIG. 1, according to another embodiment of the present disclosure.

DETAILED DESCRIPTION

Figure 1:
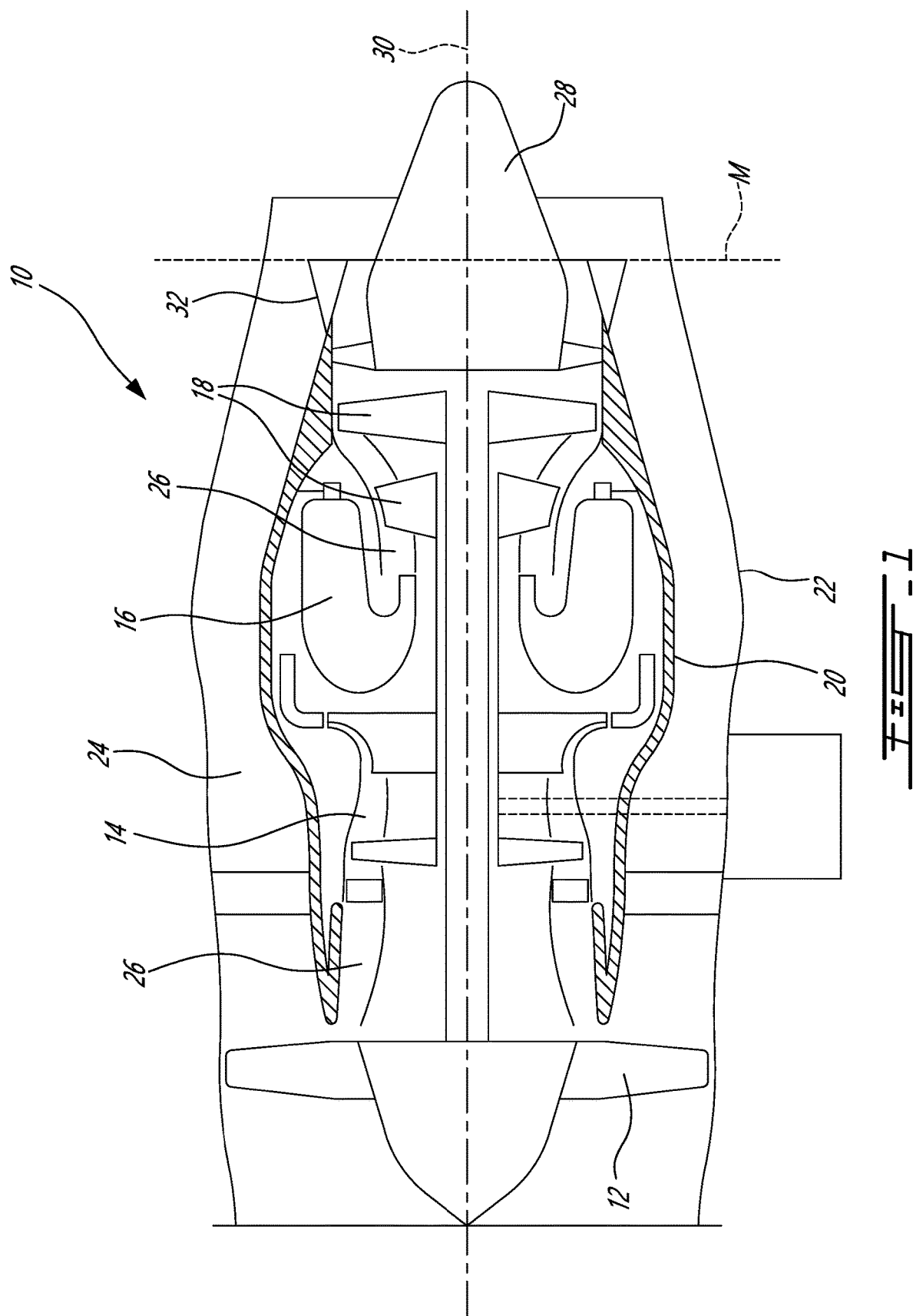
FIG. 1 is a schematic cross-sectional view of a gas turbine engine having an exhaust mixer in accordance with the present disclosure.

FIG. 1 illustrates a gas turbine engine 10 of a type preferably provided for use in subsonic flight, illustratively a long cowl turbofan engine, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

The gas turbine engine 10 includes a first casing 20 which encloses the turbo machinery of the engine, and a second, outer casing 22 extending outwardly of the first casing 20 such as to define an annular bypass passage 24 therebetween, also referred to as a bypass duct or an annular outer passage. The air propelled by the fan 12 is split into a first portion which flows around the first casing 20 within the bypass passage 24, and a second portion which flows through a main gas path 26, also referred to as a core passage, which is defined within the first casing 20 and allows the gas flow to circulate through the multistage compressor 14, combustor 16 and turbine section 18 as described above.

At the aft end of the engine 10, an axisymmetrical bullet 28 is centered on a longitudinal axis 30 (also referred to as the main or central axis) of the engine 10 and defines an inner wall of the main gas path 26 so that the combustion gases flow therearound. An annular exhaust mixer 32 surrounds at least a portion of the bullet 28, the mixer 32 acting as a rearmost portion of the outer wall defining the main gas path 26 and a rearmost portion of the inner wall defining the bypass passage 24, the bypass passage 24 coaxially surrounding the main gas path 26. The hot combustion gases from the main gas path 26 and the cooler gas (i.e., air) from the bypass passage 24 are thus mixed together by the mixer 32 at the mixing plane M (generally located at the exit of the mixer 32) such as to produce an exhaust yielding a greater thrust. In a long cowl turbofan engine, the casing 22 extends beyond the mixing plane M, and often also beyond the trailing edge of bullet 28 (although the latter is not required). An exhaust mixer assembly may be said to include the exhaust mixer 32 and the downstream portions of the annular bypass passage 24 and the main gas path 26.

Figure 2:
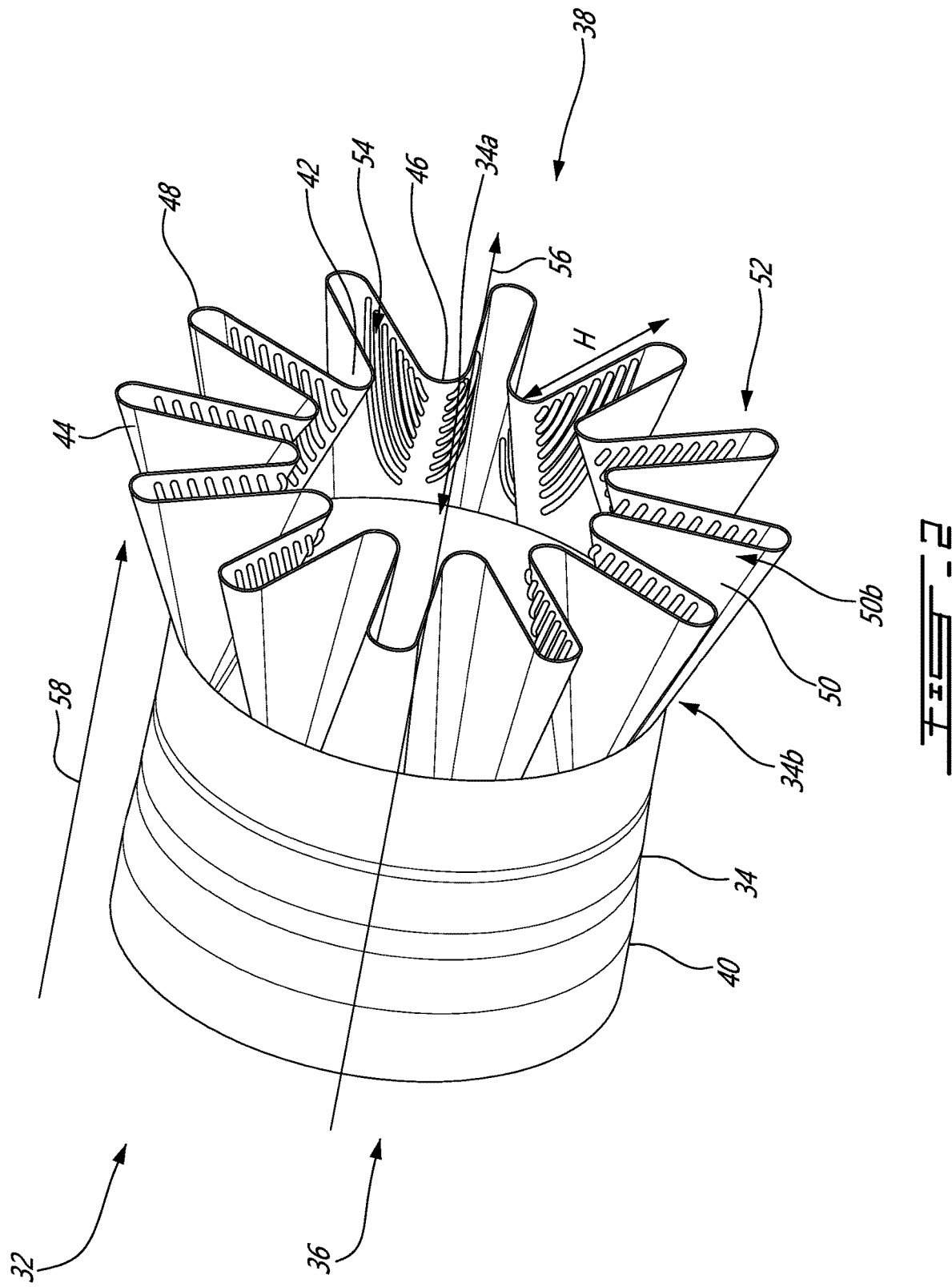
FIG. 2 is a perspective view of the exhaust mixer of the engine of FIG. 1, according to an embodiment of the present disclosure.

Referring to FIG. 2, the mixer 32 includes an annular wall 34 defining an upstream end 36 of the mixer 32 along which the flows from the main gas path 26 and from the bypass passage 24 are received, and a downstream end 38, i.e. trailing edge, where the two flows meet and are mixed together. Illustratively, the mixer 32 includes a front frustoconical portion 40 towards the upstream end 36. In other embodiments, the upstream portion of the annular wall 34 may have a consistent diameter along its axial length. The annular wall 34 includes a radially inner surface 34a and a radially outer surface 34b.

In the shown case, the annular wall 34 defines a plurality of circumferentially distributed lobes extending rearwardly from the front frustoconical portion 40 of the mixer 32. The lobes include alternating inner radial lobes 42 and outer radial lobes 44, with the outer lobes 44 extending into the bypass passage 24 and the inner lobes 42 extending into the main gas path 26 (see FIG. 1). In other cases, the lobes 42, 44 may be omitted (i.e., mixer 32 may be a non-lobed mixer, with the annular wall 34 extending towards the downstream end 38).

In the shown embodiment, each lobe 42, 44 has a radially elongated cross-section and extends longitudinally to lobe exits at the downstream end 38 of the mixer 32. The inner lobes 42 include troughs 46 (also referred to as valleys) forming an inner radial portion thereof and the outer lobes 44 include crests 48 forming an outer radial portion thereof. Between each adjacent trough 46 and crest 48, adjacent lobes 42, 44 combine to form a radial wall 50 interconnecting the adjacent trough 46 and crest 48. In some cases, each lobe 42, 44 combines to form two parallel radial walls 50. In other embodiments, the radial walls 50 need not be parallel, i.e. they may be straight and non-parallel and/or may not be purely radial, for example, the radial walls 50 may form arcs. The radial walls 50 extend longitudinally towards a trailing edge 52 of the mixer 32 at the downstream end 38. A lobe height H may be defined as a radial height between an adjacent trough 46 and crest 48 at the trailing edge 52 (i.e., between a radially-innermost point of the mixer 32 and a radially-outermost point of the mixer at the trailing edge 52).

Figure 3:
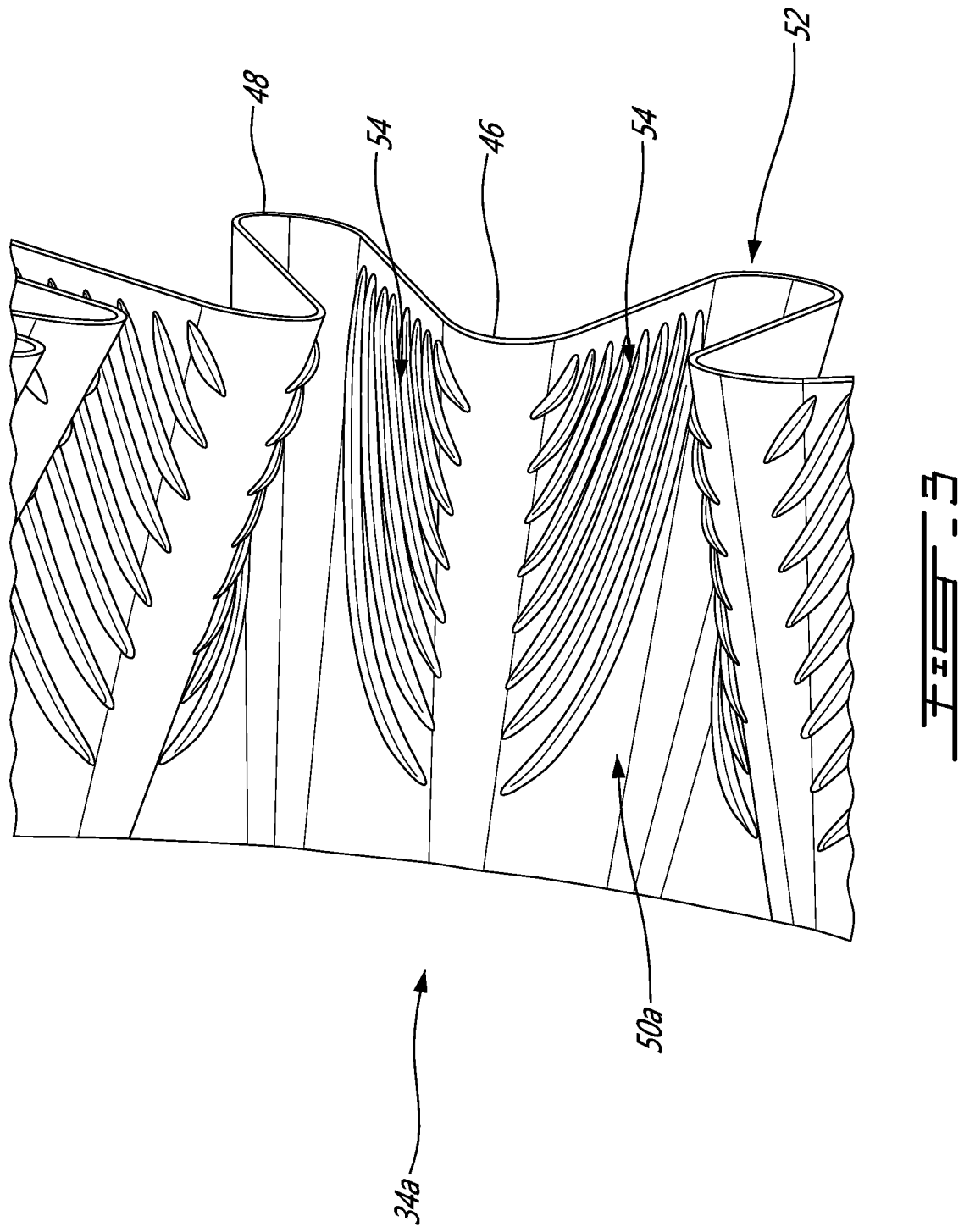
FIGS. 3 and 4 are enhanced perspective views of the exhaust mixer of FIG. 2.
Figure 4:
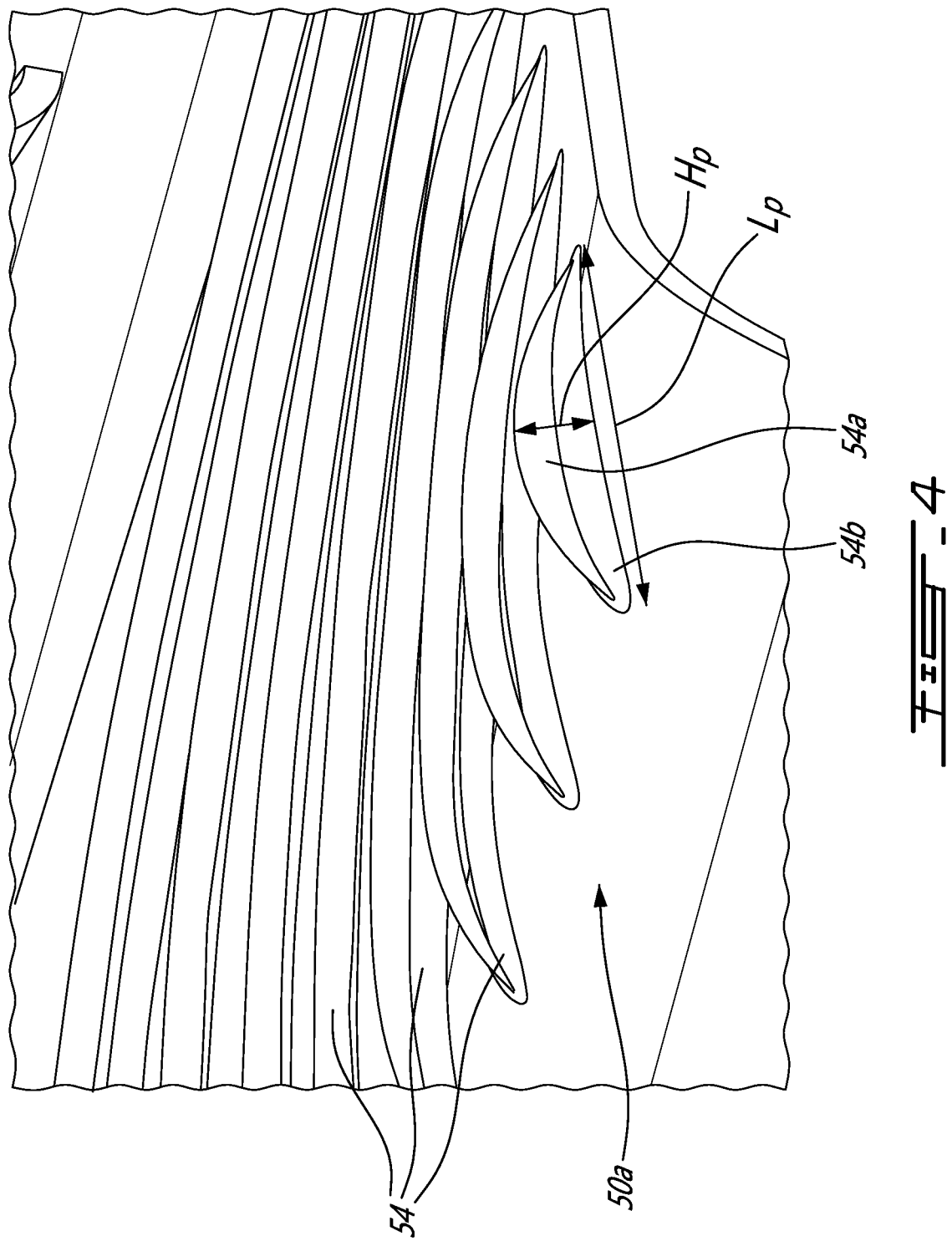

Referring to FIGS. 2-4, the mixer 32 includes protrusions 54, also referred to as riblets, disposed on the radially inner surface 34a of the annular wall 34, and more particularly on inner surfaces 50a of the radial walls 50, and extending along the radially inner surface 34a and protruding radially inwardly. In other cases, the protrusions 54 may be additionally or alternatively disposed on the radially outer surface 34b of the annular wall 34, and more particularly on outer surfaces 50b of the radial walls 50, and extending or protruding radially outwardly. The protrusions 54 are elongate, with lengths greater than their widths, and are arranged one alongside the other along the radially inner surface 34a (and/or radially outer surface 34b). In cases where the mixer 32 is a non-lobed mixer, the protrusions 54 may be disposed on the radially inner surface 34a and/or the radially outer surface 34b of the annular wall 34 towards the trailing edge 52. The exemplified protrusions 54 depicted in FIGS. 2-4 protrude radially inwardly into a core flow 56 flowing through the main gas path 26. In other cases, riblets on the outer surface of the mixer may protrude radially outwardly into a bypass flow 58 flowing through the annular bypass passage 24.

The protrusions/riblets 54 are configured to direct a boundary layer flow, i.e., the core flow 56 along the radially inner surface 34a (and/or the bypass flow 58 along the radially outer surface 34b of the mixer 32 or both, as will be discussed in further detail below), along the inner/outer walls thereof for improved mixing downstream of the mixer 32. In the embodiment shown in FIGS. 2-4, the protrusions 54 on the inner surface 50a of the radial walls 50 are operable to direct the core flow 56 along the inner surface 50a in a radially outward direction for improved mixing with the bypass flow 58 downstream of the mixer 32. The dimensions, shape and orientation of the protrusions 54 may vary, for instance based on the geometry of the radial walls 50 and the characteristics of the boundary layers at the transition from the annular wall 34 to the radial walls 50, thereby allowing to fine tune the protrusions 54 effect on mixing of the core flow 56 with the bypass flow 58 downstream of the mixer 32. In the shown case, the protrusions 54 begin axially at the upstream end of the lobes 42, 44 and terminate just upstream of the trailing edge 52 relative the gases flowing through the mixer. The protrusions 54 are illustratively arranged side-by-side in parallel, and generally follow the curvature of the lobes 42, 44. Other arrangements may be contemplated. The protrusions 54 may be angled relative to the axial direction to follow the angle of the lobes 42, 44 and divert the gas flow in a radial inward and/or outward direction, depending on the inner and/or outer placement of the protrusions 54. As such, the protrusions 54 may affect the interface between incoming gas flows at the exit of the engine 10 (core flow 56 and bypass flow 58) to improve engine acoustics and performance (e.g., specific fuel consumption).

The number of protrusions 54 and spacing between protrusions 54 may vary, and may be inversely correlated. For instance, a lower number of protrusions 54 may be spaced further apart along an inner or outer surface 50a, 50b (or vice-versa). The spacing between protrusions 54 may vary along inner or outer surfaces 50a, 50b, for instance, based on the required flow guidance of the core flow 56 and/or the bypass flow 58. Said required flow guidance may vary, for instance, based on local boundary layer characteristics and local streamwise pressure gradients of the flows. Other numbers of protrusions 54 may be contemplated depending on the intended applications.

The radial protrusion height $H_P$ of each protrusion 54 may vary. In an embodiment, the minimum height of each protrusion 54 depends on a boundary layer thickness of the incoming gas flow (core flow 56 and/or bypass flow 58) at the interface between annular wall 34 and radial walls 50. In some cases, the protrusion height $H_P$ is greater than one third of a thickness of the boundary layer to ensure that fluid in the near-wall region of the boundary layer, where a majority of the boundary-layer vorticity is found, is suitably directed by the protrusions, as this vorticity may drive the improved mixing and acoustic performance when the core flow 56 and/or the bypass flow 58 mix downstream of the trailing edge 52. In addition, in some cases respective protrusion heights $H_P$ may vary from one protrusion 40 to the next, as local boundary layer characteristics may vary along walls 50a, 50b.

In the embodiment shown in FIG. 4, each protrusion 54 has a semi-circular cross section that increases in protrusion height $H_P$ towards protrusion midpoint 54a and tapers, illustratively via filets, towards its protrusion endpoints 54b. In some cases, by increasing the protrusion height $H_P$, and thereby the penetration of the protrusions 54 into the core flow 56 and/or the bypass flow 58, the protrusions 54 may cause more of the core flow 56 to migrate radially outwards at the trailing edge 52 (and/or cause more of the bypass flow 58 to migrate radially inwards at the trailing edge 52), thereby increasing the mixing efficiency between the core flow 56 and the bypass flow 58 at the mixing plane M. In various cases, to improve the efficiency of mixing between the core flow 56 and the bypass flow 58, the spacing between adjacent protrusions 54 may correspond to about 1-5 times the maximum protrusion height $H_P$.

A protrusion length $L_P$ of each protrusion 54 along the inner surface 50a (and/or outer surface 50b) may vary from one protrusion 54 to another. In the shown case, the protrusion lengths $L_P$ of each protrusion 54 increase in magnitude from a trough 46 to a crest 48, as the streamwise extent of flow guidance needed may vary between different locations on surfaces 50a, 50b as dictated by variations in the local boundary-layer characteristics and local streamwise pressure gradients. Other arrangements may be contemplated, for instance protrusions 54 of equal protrusion length $L_P$.

Referring to FIG. 5, in another embodiment, the mixer 32 is a scalloped mixer. Stated differently, the annular wall 34 includes scalloped shaped cutouts 60 between adjacent troughs 46 and crests 48. Each scalloped-shaped cutout 60 extends from the downstream end 38 of the mixer 32 in an upstream direction, creating a curved cutout that narrows in width towards the upstream direction. The trailing edge 52 thus includes the edges of the scalloped shaped cutouts 60. While the dimensions of the scalloped-shaped cutouts 60 (e.g., their radial depth and/or their axial width) may vary, the scalloped-shaped cutouts 60 may be identically sized and shaped to one another. In addition, the number of scalloped-shaped cutouts 60 may vary. In the shown case, scalloped-shaped cutouts 60 are found on every second adjacent radial wall 50. A greater or lesser number of scalloped-shaped cutouts 60 may be contemplated, for instance a scalloped shaped cutout 60 on each radial wall 50. The mixer 32 as shown in FIG. 5 may include protrusions 54 as in the mixer shown in FIGS. 2-4, which may vary in quantity, size, shape, arrangement and orientation, as discussed above.

Referring to FIG. 6, in another embodiment, the mixer 32 may include protrusions 54 disposed on the radially outer surface 34b of the annular wall 34, illustratively on the outer surface 50b of the radial walls 50, and extending or protruding in a radially outward direction. The quantity, size, shape, arrangement and orientation of the protrusions 54 may vary, as discussed above with regards to mixer of FIGS. 2-4. In the embodiment shown in FIG. 6, the protrusions 54 on the outer surface 50b of the radial walls 50 are operable to direct the bypass flow 58 along the outer surface 50b in a radially inward direction for improved mixing with the core flow 56 downstream of the mixer 32.

Referring to FIG. 7, in another embodiment, the mixer 32 may include protrusions 54 disposed both on the radially inner surface 34a and on the radially outer surface 34b of the annular wall, illustratively on the outer surface 50b of the radial walls 50. The quantity, size, shape, arrangement and orientation of the protrusions 54 may vary, as discussed above with regards to mixer of FIGS. 2-4. In the embodiment shown in FIG. 7, the radially-inward protruding protrusions 54 on the inner surface 50a of the radial walls 50 are operable to direct the core flow 56 along the inner surface 50a in a radially outward direction for improved mixing with the bypass flow 58 downstream of the mixer 32, while the radially-outward protruding protrusions 54 on the outer surface 50b of the radial walls 50 are operable to direct the bypass flow 58 along the outer surface 50b in a radially inward direction for improved mixing with the core flow 56 downstream of the mixer 32. In various cases, the number, positioning and sizing of protrusions 54 may differ in the inner surface 50a versus the outer surface 50b, for instance to account for the differences in flows on either side of the walls 50.

According to an exemplary embodiment, there is taught a method for operating a turbofan engine. A core gas flow 56 through a main gas path 26 of the turbofan engine 10. A bypass gas flow 58 is directed through an annular bypass passage 24 of the turbofan engine 10. The core gas flow 56 and the bypass gas flow 58 are mixed at an exhaust mixer 32 in fluid communication with the core passage 26 and the outer annular passage 24, the exhaust mixer 32 having an upstream end 36, a downstream end 38 and an annular wall 34 extending therebetween, the annular wall 34 defining a mixing plane M at a trailing edge 52 thereof at the downstream end 38 at which gases in the core passage 26 and the outer annular passage 24 are mixed, the annular wall 34 having a radially inner surface 34a and a radially outer surface 34b, a plurality of protrusions 54 disposed on and extending laterally along and radially from at least one of the radially inner surface 34a and the radially outer surface 34b, the plurality of protrusions 54 arranged one alongside another on the at least one of the radially inner surface 34a and the radially outer surface 34b. A mixture of the core gas flow 56 and the bypass gas flow 58 are exhausted from the turbofan engine 10.

In the present disclosure, when a specific numerical value is provided (e.g. as a maximum, minimum or range of values), it is to be understood that this value or these ranges of values may be varied, for example due to applicable manufacturing tolerances, material selection, etc. As such, any maximum value, minimum value and/or ranges of values provided herein include(s) all values falling within the applicable manufacturing tolerances. Accordingly, in certain instances, these values may be varied by ±5%. In other implementations, these values may vary by as much as ±10%. A person of ordinary skill in the art will understand that such variances in the values provided herein may be possible without departing from the intended scope of the present disclosure, and will appreciate for example that the values may be influenced by the particular manufacturing methods and materials used to implement the claimed technology.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An exhaust mixer assembly for a gas turbine engine, the exhaust mixer assembly comprising:
    a core passage extending along a central axis of the gas turbine engine for directing a core gas flow;
    an outer annular passage coaxially surrounding the core passage for directing a bypass gas flow; and an exhaust mixer communicating with the core passage and the outer annular passage, the exhaust mixer having an upstream end, a downstream end and an annular wall extending therebetween, the annular wall defining a mixing plane at a trailing edge thereof at the downstream end at which the core gas flow and the bypass gas flow are mixed, the annular wall defining a plurality of circumferentially distributed alternating inner radial lobes and outer radial lobes, the inner radial lobes including troughs forming an inner radial portion thereof and the outer radial lobes including crests forming an outer radial portion thereof, adjacent inner radial lobes and outer radial lobes having radial walls interconnecting adjacent troughs and crests, a first radial wall of the radial walls having an inner surface and an outer surface, wherein the exhaust mixer has a radial array of riblets disposed on at least one of the inner surface and the outer surface of the first radial wall, the riblets of the radial array of riblets arranged one alongside another on the at least one of the inner surface and the outer surface of the first radial wall radially between the troughs and the crests, wherein the riblets of the radial array of riblets have a height ($H_P$) in a direction normal to the first radial wall which is less than a distance between the first radial wall and a second adjacent radial wall of the radial walls.

2. The exhaust mixer assembly as defined in claim 1, wherein the riblets of the radial array of riblets are disposed on and extend laterally along and radially from the inner surface and the outer surface of the first radial wall.

3. The exhaust mixer assembly as defined in claim 1, wherein one or more of the inner radial lobes and the outer radial lobes includes a scalloped-shaped cutout therein.

4. The exhaust mixer assembly as defined in claim 1, wherein the riblets of the radial array of riblets have a rounded cross-sectional shape including a semi-circular tip and a filet at a junction with the first radial wall.

5. The exhaust mixer assembly as defined in claim 1, wherein the height ($H_P$) of the riblets of the radial array of riblets increases, along a riblet length, from respective riblet endpoints to a riblet midpoint.

6. The exhaust mixer assembly as defined in claim 1, wherein a riblet length along at least one of the inner surface and the outer surface of the first radial wall increases from one of the riblets of the radial array of riblets to another one of the riblets of the radial array of riblets in a direction from one of the troughs to an adjacent one of the crests.

7. The exhaust mixer assembly as defined in claim 1, wherein the riblets of the radial array of riblets are disposed on and extend inwardly from the inner surface, and are angled along the inner surface to direct the core gas flow from the core passage in a radially outward direction.

8. The exhaust mixer assembly as defined in claim 1, wherein the riblets of the radial array of riblets are disposed on and extend outwardly from the outer surface, and are angled along the outer surface to direct the bypass gas flow from the outer annular passage in a radially inward direction.

9. The exhaust mixer assembly as defined in claim 1, wherein a spacing between adjacent riblets of the radial array of riblets corresponds to 1 to 5 times a maximum height ($H_P$) of the radial array of riblets.

10. A turbofan exhaust mixer comprising an annular wall extending around a central axis, the annular wall extending axially from an upstream end to a downstream end, the annular wall defining between the upstream end and the downstream end a plurality of circumferentially distributed alternating inner radial lobes and outer radial lobes, the inner radial lobes including troughs forming an inner radial portion thereof and the outer radial lobes including crests forming an outer radial portion thereof, adjacent inner radial lobes and outer radial lobes having radial walls interconnecting adjacent troughs and crests, each of the radial walls having an inner surface and an outer surface, a plurality of riblets radially distributed on at least one of the inner surface and the outer surface of each of the radial walls between the troughs and the crests, the plurality of riblets arranged one alongside another on the at least one of the inner surface and the outer surface, wherein the plurality of riblets have a height ($H_P$) in a direction normal to respective ones of the radial walls from which the plurality of riblets extend, wherein the height ($H_P$) is less than a distance between adjacent ones of the radial walls.

11. The turbofan exhaust mixer as defined in claim 10, wherein the plurality of riblets are disposed on both the inner surface and the outer surface of the radial walls.

12. The turbofan exhaust mixer as defined in claim 10, wherein one or more of the inner radial lobes and the outer radial lobes includes a scalloped-shaped cutout therein.

13. The turbofan exhaust mixer as defined in claim 10, wherein the plurality of riblets have a semi-circular cross-sectional shape.

14. The turbofan exhaust mixer as defined in claim 10, wherein the height ($H_P$) of the plurality of riblets increases, along a riblet length along at least one of the inner surface and the outer surface, from respective riblet endpoints to a riblet midpoint.

15. The turbofan exhaust mixer as defined in claim 10, wherein a spacing between adjacent riblets of the plurality of riblets corresponds to 1 to 5 times a maximum height ($H_P$) of the plurality of riblets.

16. A method for operating a turbofan engine, comprising:
directing a core gas flow through a main gas path of the turbofan engine;
directing a bypass gas flow through an annular bypass passage of the turbofan engine;
mixing the core gas flow and the bypass gas flow at an exhaust mixer in fluid communication with the main gas path and the annular bypass passage, the exhaust mixer having an upstream end, a downstream end and an annular wall extending therebetween, the annular wall defining a mixing plane at a trailing edge thereof at the downstream end at which the core gas flow and the bypass gas flow are mixed, the annular wall defining a plurality of circumferentially distributed alternating inner radial lobes and outer radial lobes, the inner radial lobes including troughs forming an inner radial portion thereof and the outer radial lobes including crests forming an outer radial portion thereof, adjacent inner radial lobes and outer radial lobes having radial walls interconnecting adjacent troughs and crests, the radial walls having an inner surface and an outer surface, a plurality of riblets radially distributed on at least one of the inner surface and the outer surface of the radial walls, the plurality of riblets arranged one alongside another on the at least one of the inner surface and the outer surface, the plurality of riblets have a height ($H_P$) in a direction normal to respective ones of the radial walls from which the plurality of riblets extend, and wherein the height ($H_P$) is less than a distance between adjacent ones of the radial walls; and
exhausting a mixture of the core gas flow and the bypass gas flow from the turbofan engine.

17. The method as defined in claim 16, wherein a spacing between adjacent riblets of the plurality of riblets corresponds to 1 to 5 times a maximum height ($H_P$) of the plurality of riblets.

\* \* \* \* \*